(12) United States Patent
Furht et al.

(10) Patent No.: US 12,075,046 B2
(45) Date of Patent: Aug. 27, 2024

(54) SHAPE ADAPTIVE DISCRETE COSINE TRANSFORM FOR GEOMETRIC PARTITIONING WITH AN ADAPTIVE NUMBER OF REGIONS

(71) Applicant: OP Solutions, LLC, Amherst, MA (US)

(72) Inventors: Borivoje Furht, Boca Raton, FL (US); Hari Kalva, Boca Raton, FL (US); Velibor Adzic, Canton, GA (US)

(73) Assignee: OP Solutions, LLC, Amherst, MA (US)

( * ) Notice: Subject to any disclaimer, the term of this patent is extended or adjusted under 35 U.S.C. 154(b) by 243 days.

(21) Appl. No.: 17/386,126

(22) Filed: Jul. 27, 2021

(65) Prior Publication Data

US 2021/0360246 A1 Nov. 18, 2021

Related U.S. Application Data

(63) Continuation of application No. PCT/US2020/015401, filed on Jan. 28, 2020.
(Continued)

(51) Int. Cl.
*H04N 19/119* (2014.01)
*H04N 19/12* (2014.01)
(Continued)

(52) U.S. Cl.
CPC .......... *H04N 19/12* (2014.11); *H04N 19/119* (2014.11); *H04N 19/159* (2014.11);
(Continued)

(58) Field of Classification Search
CPC .... H04N 19/12; H04N 19/119; H04N 19/159; H04N 19/513; H04N 19/61;
(Continued)

(56) References Cited

U.S. PATENT DOCUMENTS 9,159,141 B2 10/2015 Bordes et al.
9,924,181 B2 3/2018 Chuang
(Continued)

FOREIGN PATENT DOCUMENTS

EP 2446627 A1 5/2021
WO 2018/034373 A1 2/2018
(Continued)

OTHER PUBLICATIONS

Lucas et al, "Intra Predictive Depth Map Coding Using Flexible Block Partitioning," IEEE Transactions on Image Processing, vol. 24, No. 11, Nov. 2015.
(Continued)

*Primary Examiner* — Tat C Chio
(74) *Attorney, Agent, or Firm* — OP Solutions IP Department; Paul Ackerman (57) ABSTRACT

A decoder includes circuitry configured to receive a bitstream; determine a first region, a second region, and a third region of a current block and according to a geometric partitioning mode and decoding the current block. Related apparatus, systems, techniques and articles are also described. Decoder may determine, from a signal contained in the bitstream, a coding transformation type to decode the first region, the second region, and/or the third region, the coding transformation type characterizing at least an inverse block discrete cosine transformation and an inverse shape adaptive discrete cosine transformation, and the decoding of the current block may include using the determined transformation type for inverse transformation for each of the first region, the second region and/or the third region.

4 Claims, 6 Drawing Sheets

Related U.S. Application Data (60) Provisional application No. 62/797,799, filed on Jan. 28, 2019.

(51) Int. Cl.
*H04N 19/159* (2014.01)
*H04N 19/513* (2014.01)
*H04N 19/61* (2014.01)
*H04N 19/625* (2014.01)

(52) U.S. Cl.
CPC .......... *H04N 19/513* (2014.11); *H04N 19/61* (2014.11); *H04N 19/625* (2014.11)

(58) Field of Classification Search
CPC .. H04N 19/625; H04N 19/124; H04N 19/176; H04N 19/593; H04N 19/86; H04N 19/122; H04N 19/17; H04N 19/70; H04N 19/96; H04N 19/184
See application file for complete search history.

(56) References Cited

U.S. PATENT DOCUMENTS

| | | | |
|---|---|---|---|
| 10,334,258 B2 | 6/2019 | Sim | |
| 10,666,936 B2 | 5/2020 | Lee | |
| 11,259,014 B2* | 2/2022 | Furht | H04N 19/119 |
| 11,695,922 B2* | 7/2023 | Furht | H04N 19/593 |
| | | | 375/240.16 |
| 2002/0196342 A1 | 12/2002 | Walker et al. | |
| 2003/0076325 A1 | 4/2003 | Thrasher | |
| 2007/0172117 A1 | 7/2007 | Wong | |
| 2009/0196342 A1 | 8/2009 | Divorra Escoda et al. | |
| 2010/0208818 A1 | 8/2010 | Yin et al. | |
| 2011/0200109 A1* | 8/2011 | Joshi | H04N 19/137 |
| | | | 375/E7.115 |
| 2012/0147961 A1 | 6/2012 | Guo et al. | |
| 2013/0208982 A1 | 8/2013 | Bordes | |
| 2013/0287109 A1 | 10/2013 | Wang et al. | |
| 2014/0247876 A1 | 9/2014 | Moriya et al. | |
| 2014/0301470 A1 | 10/2014 | Yie et al. | |
| 2014/0341290 A1 | 11/2014 | Merkle et al. | |
| 2015/0271517 A1* | 9/2015 | Pang | H04N 19/52 |
| | | | 375/240.16 |
| 2016/0162548 A1 | 6/2016 | Dickie et al. | |
| 2018/0063528 A1 | 3/2018 | An et al. | |
| 2018/0077423 A1 | 3/2018 | Xu et al. | |
| 2018/0278932 A1 | 9/2018 | Mukherjee et al. | |
| 2019/0364296 A1* | 11/2019 | Zhao | H04N 19/176 |
| 2020/0296371 A1* | 9/2020 | Azukizawa | H04N 19/159 |
| 2021/0185357 A1* | 6/2021 | Tsukuba | H04N 19/61 |
| 2021/0218977 A1 | 7/2021 | Kalva et al. | |
| 2021/0243461 A1 | 8/2021 | Park | |
| 2021/0274162 A1 | 9/2021 | Ahn | |
| 2021/0289198 A1 | 9/2021 | Liao et al. | |
| 2023/0308640 A1* | 9/2023 | Furht | H04N 19/176 |

FOREIGN PATENT DOCUMENTS

| | | |
|---|---|---|
| WO | 2019246535 A1 | 6/2019 |
| WO | 2020116402 A1 | 6/2020 |
| WO | 2020159988 A1 | 8/2020 |
| WO | 2011130186 A2 | 4/2022 |

OTHER PUBLICATIONS

Blaser et al, "Geometry-base Partitioning for Predictive Video Coding with Transform Adaptation," IEEE PCS, Jun. 2018, 978-1-5386-4160.

Extended Search Report in EP 19869208.9.

Divorra et al, "Geometry-adaptive Block Partitioning," Video Coding Experts Group, 32nd Meeting, San Jose, CA, VCEG-AF10, Apr. 2007.

Blaser et al "Description of SDR and 360 Video Coding Technology proposal by RWTH Aachen University", JVET Meeting Apr. 10, 2018-Apr. 20, 2018, San Diego. JVET-J0023, Apr. 2018.

Geometric Deriving MV for Motion Prediction in Block Based Video Coding 2017.

Geometry-based Partitioning for Predictive Coding with Transform Adaptation 2018.

Chen et al., "Algorithm Description for Versatile Video Coding and Test Model 3 (VTM 3)," 12th Meeting, Macao, CN. JVET-L1002-V1, Oct. 2018.

PCT/US20/15401; International Search Report; Date: May 1, 2020; By: Authorized Officer Lee Young.

* cited by examiner

SHAPE ADAPTIVE DISCRETE COSINE TRANSFORM FOR GEOMETRIC PARTITIONING WITH AN ADAPTIVE NUMBER OF REGIONS

CROSS-REFERENCE TO RELATED APPLICATIONS

This application claims the benefit of priority of International Patent Application Serial No. PCT/US20/15401, filed on Jan. 28, 2020, and titled "SHAPE ADAPTIVE DISCRETE COSINE TRANSFORM FOR GEOMETRIC PARTITIONING WITH AN ADAPTIVE NUMBER OF REGIONS," which is incorporated by reference herein in its entirety, and which claims the benefit of priority of U.S. Provisional Patent Application Ser. No. 62/797,799, filed on Jan. 28, 2019, and titled "SHAPE ADAPTIVE DISCRETE COSINE TRANSFORM FOR GEOMETRIC PARTITIONING WITH AN ADAPTIVE NUMBER OF REGIONS," which is incorporated by reference herein in its entirety.

FIELD OF THE INVENTION

The present invention generally relates to the field of video compression. In particular, the present invention is directed to a shape adaptive discrete cosine transform for geometric partitioning with an adaptive number of regions.

BACKGROUND

A video codec can include an electronic circuit or software that compresses or decompresses digital video. It can convert uncompressed video to a compressed format or vice versa. In the context of video compression, a device that compresses video (and/or performs some function thereof) can typically be called an encoder, and a device that decompresses video (and/or performs some function thereof) can be called a decoder.

A format of the compressed data can conform to a standard video compression specification. The compression can be lossy in that the compressed video lacks some information present in the original video. A consequence of this can include that decompressed video can have lower quality than the original uncompressed video because there is insufficient information to accurately reconstruct the original video.

There can be complex relationships between the video quality, the amount of data used to represent the video (e.g., determined by the bit rate), the complexity of the encoding and decoding algorithms, sensitivity to data losses and errors, ease of editing, random access, end-to-end delay (e.g., latency), and the like.

SUMMARY OF THE DISCLOSURE

In an aspect, a decoder includes circuitry configured to receive a bitstream including a coded coding unit and signaling information for the coding unit, the signaling information indicating that the coding unit is inter-predicted, the coding unit has a first partitioned region, and a residual of the coding unit in the first partitioned region is encoded by a first transform in a vertical direction and a second transform in a horizontal direction, wherein each of the first transform and the second transform has been determined depending on a location and shape of the first partitioned region in the coding unit; and decode the coding unit, wherein decoding further includes inverting the first transform, inverting the second transform, and reconstructing residual in the first partitioned region.

In another aspect a method includes receiving, by a decoder, a bitstream including a coded coding unit and signaling information for the coding unit, the signaling information indicating that the coding unit is inter-predicted, the coding unit has a first partitioned region and a residual of the coding unit in the first partitioned region is encoded by a first transform in a vertical direction and a second transform in a horizontal direction, wherein each of the first transform and the second transform has been determined depending on a location and shape of the first partitioned region in the coding unit, and decoding, by the decoder, the coding unit, wherein decoding further includes inverting the first transform inverting the second transform, and reconstructing residual in the first partitioned region.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted. Like reference symbols in the various drawings indicate like elements.

DETAILED DESCRIPTION

At a high level, aspects of the present disclosure are directed to systems and methods for A. In an embodiment, B.

Embodiments presented in this disclosure pertain to encoding and decoding blocks in geometric partitioning, where not all blocks are necessarily rectangular. Embodiments may include and/or be configured to perform encoding and/or decoding using discrete cosine transformations (DCT) and/or inverse DCTs. In some embodiments presented herein, a choice of DCT is made as a function of information content in geometrically partitioned blocks. In some existing video encoding and decoding approaches, all blocks are rectangular, and the residual is encoded using a regular Block DCT (B-DCT) for the entire rectangular block. However, in geometric partitioning where a block can be partitioned into multiple non-rectangular regions, use of regular B-DCT can inefficiently represent the underlying pixel information for some blocks and can require unnecessary computing resources to perform. In some implementations of the current subject matter, when using a geometric partitioning mode, an encoder may use Shape Adaptive DCT (SA-DCT) alternatively or additionally to B-DCT. In some embodiments, an encoder may select between B-DCT and SA-DCT for each region of a block such as a geometrically partitioned block, based on a level of prediction error of that region; selection may be signaled in the bitstream for use in decoding. By encoding and/or decoding a non-rectangular region using either B-DCT or SA-DCT and signaling such selection, a bitrate of transmission in a bitstream may be reduced because a residual may be represented more efficiently, and computational resources required to perform the processing may be reduced as a result. The current subject matter may be applicable to relatively larger blocks, such as blocks with a size of 128×128 or 64×64, for example. In some implementations, geometric partitioning may involve partitioning a current block into an adaptive number of regions, such as three or more regions for a given current block; a DCT transform type (e.g., B-DCT or SA-DCT) may be signaled for each region.

In an embodiment, a B-DCT may be a DCT performed using an N×N invertible matrix on an N×N block of numerical values such as without limitation chroma and/or luma values of a corresponding N×N array of pixels. For instance, and as a non-limiting example, where an N×N matrix X is to be transformed, a "DCT-I" transformation may compute each element of a transformed matrix as:

$$X_k = \frac{1}{2}(x_0 + (-1^k)x_{N-1}) + \sum_{n=1}^{N-2} x_n \cos\left[\frac{\pi}{N-1}nk\right]$$

For k=0, ..., N−1. As a further non-limiting example, a "DCT-II" transformation may compute transformed matrix values as:

$$X_k = \sum_{n=1}^{N-1} x_n \cos\left[\frac{\pi}{n}\left(n + \frac{1}{2}\right)k\right]$$

For k=0, ..., N−1. As an illustrative example, where blocks are 4×4 blocks of pixels, the generalized discrete cosine transform matrix may include a generalized discrete cosine transform II matrix taking the form of:

$$T = \begin{pmatrix} a & a & a & a \\ b & c & -c & -b \\ a & -a & -a & a \\ c & -b & b & -c \end{pmatrix}$$

where a is ½, b is $$\sqrt{\frac{1}{2}}\cos\frac{\pi}{8}, \text{ and } c \text{ is } \sqrt{\frac{1}{2}}\cos\frac{3\pi}{8}.$$

In some implementations, an integer approximation of a transform matrix may be utilized, which may be used for efficient hardware and software implementations. For example, where blocks are 4×4 blocks of pixels, a generalized discrete cosine transform matrix may include a generalized discrete cosine transform II matrix taking the form of:

$$T_{INT} = \begin{pmatrix} 1 & 1 & 1 & 1 \\ 2 & 1 & -1 & -2 \\ 1 & -1 & -1 & 1 \\ 1 & -2 & 2 & -1 \end{pmatrix}.$$

Inverse B-DCT may be computed by a second matrix multiplication using the same N×N transform matrix; a resulting output may be normalized to recover original values. For instance, an inverse DCT-I may be multiplied by $$\frac{2}{N-1}$$

for normalization.

An SA-DCT may be performed on a non-rectangular array of pixels. In an embodiment, an SA-DCT may be computed by performing a one-dimensional version of a DCT such as a DCT-I, DCT-II, or the like against vectors representing vertical columns of pixel values in a shape in interest, followed by resulting values being grouped into horizontal vectors and subjected to a one-dimensional DCT a second time; the second DCT may result in a completed transformation of pixel values. Variations of SA-DCT may further scale and/or normalize by coefficients to correct for mean weighting defects and/or non-orthonormal defects introduced by the above transformation, quantization of outputs of the above transformation and/or inversion of transformation outputs and/or quantized transformation outputs. Further corrections may be performed, without limitation, by preceding the above SA-DCT process by subtracting an individual mean value of a subject image region from each pixel value or a scaled version thereof, potentially in combination with one or other of the scaling processes applied before and/or after transformation, quantization, and/or inverse transformation. Persons skilled in the art, upon reviewing the entirety of this disclosure, will be aware of various alternative or additional variations on an SA-DCT process that may be applied consistently with the above description.

Motion compensation may include an approach to predict a video frame or a portion thereof given previous and/or future frames by accounting for motion of a camera and/or of objects in a video containing and/or represented by current, previous, and/or future frames. Motion compensation may be employed in encoding and decoding of video data for video compression, for example in encoding and decoding using the Motion Picture Experts Group (MPEG)-2 (also referred to as advanced video coding (AVC)) standard. Motion compensation may describe a picture in terms of a transformation of a reference picture to a current picture. Reference picture may be previous in time or from the future when compared to current picture. When images can be accurately synthesized from previously transmitted and/or stored images, compression efficiency can be improved.

Block partitioning, as used in this disclosure, may refer to a method in video coding to find regions of similar motion. Some form of block partitioning can be found in video codec standards including MPEG-2, H.264 (also referred to as AVC or MPEG-4 Part 10), and H.265 (also referred to as High Efficiency Video Coding (HEVC)). In example block partitioning approaches, non-overlapping blocks of a video frame may be partitioned into rectangular sub-blocks to find block partitions that contain pixels with similar motion. This approach may work well when all pixels of a block partition have similar motion. Motion of pixels in a block may be determined relative to previously coded frames.

Figure 1:
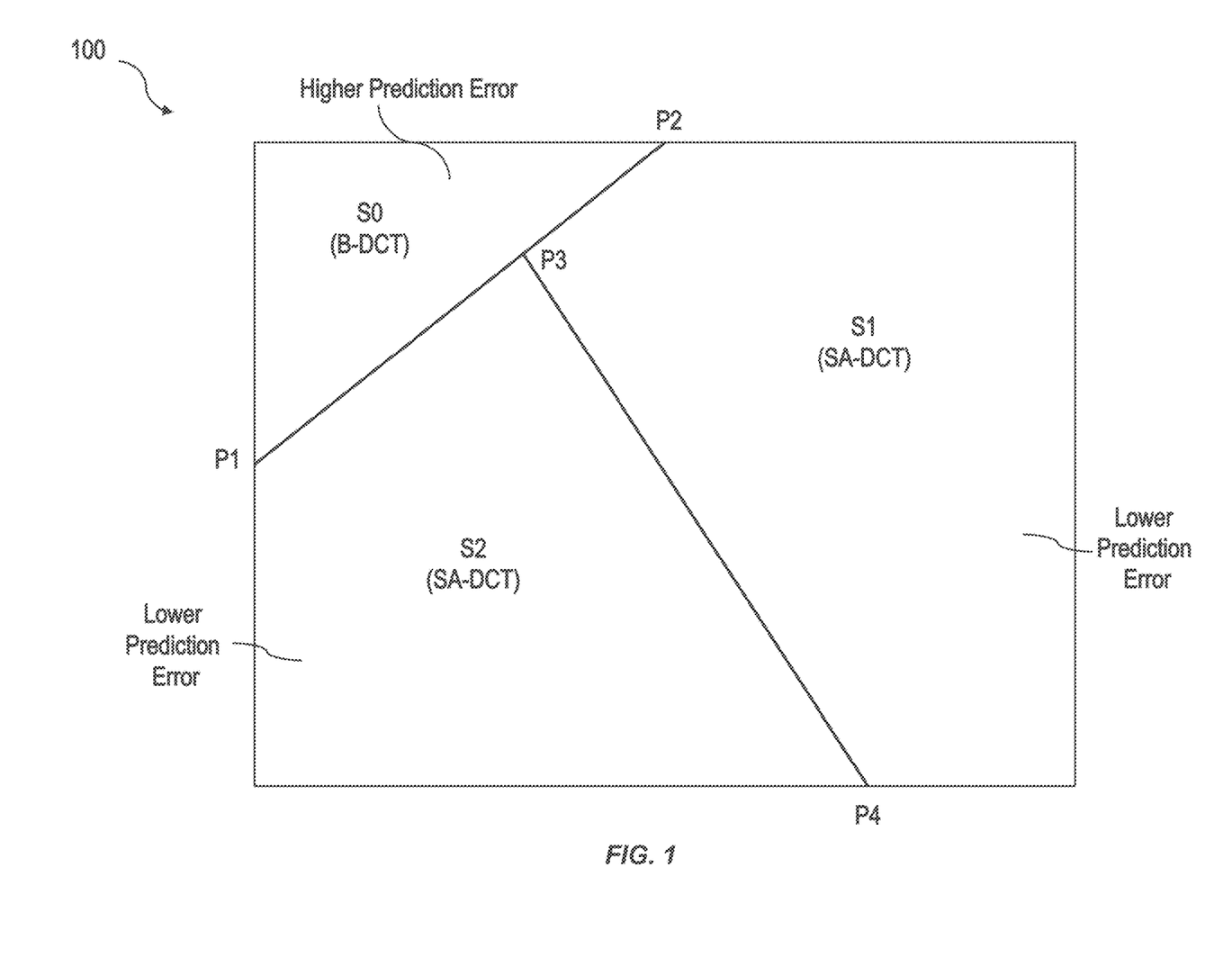
FIG. 1 is an illustration showing an example of a residual block (e.g., current block) with exponential partitioning where there are three segments with different prediction errors.

Shape-adaptive DCT and/or B-DCT may be effectively used in geometric partitioning with adaptive number of regions. FIG. 1 is an illustration showing a non-limiting example of a residual block (e.g., current block) 100 sized 64×64 or 128×128 with geometric partitioning where there are three segments, S0, S1, and S2 with different prediction errors; although three segments are illustrated in FIG. 1 for exemplary purposes, a greater or lesser number of segments may alternatively or additionally be employed. Current block may be geometrically partitioned according to two line segments (P1P2 and P3P4), which may divide the current block into the three regions S0, S1, and S2. In this example, S0 may have a relatively high prediction error while S1 and S2 can have a relatively lower prediction error. For segment S0 (also referred to as region), the encoder may select and use B-DCT for residual coding. For segments S1 and S2 with low prediction error, the encoder may select and use SA-DCT. The selection of residual encoding transformation can be based on a prediction error (e.g., size of the residual). Because SA-DCT algorithm is relatively simpler in terms of complexity and does not require as many computation as the B-DCT, utilizing SA-DCT for lower prediction error residual coding may improve complexity and processing performance for video encoding and decoding.

Accordingly, and still referring to FIG. 1, SA-DCT may be signaled as an additional transform choice to full block DCT for segments with low prediction errors. What is considered low or high error may be a parameter that can be set at the encoder and may vary based on application. A choice of transformation type may be signaled in the bitstream. At a decoder, bitstream may be parsed, and for a given current block, a residual may be decoded using a transform type signaled in the bitstream. In some implementations, a number of coefficients associated with the transform may alternatively or additionally be signaled in the bitstream.

In more detail, and continuing to refer to FIG. 1, geometric partitioning with an adaptive number of regions may include techniques for video encoding and decoding in which a rectangular block is further divided into two or more regions that may be non-rectangular. For example, FIG. 1 illustrates a non-limiting example of geometric partitioning at the pixel level with an adaptive number of regions. An example rectangular block 100 (which can have a width of M pixels and a height of N pixels, denoted as M×N pixels) may be divided along a line segment P1P2 and P3P4 into three regions (S0, S1, and S2). When pixels in S0 have similar motion, a motion vector may describe the motion of all pixels in that region; the motion vector can be used to compress region S0. Similarly, when pixels in region S1 have similar motion, an associated motion vector may describe the motion of pixels in region S1. Similarly, when pixels in region S2 have similar motion, an associated motion vector may describe the motion of pixels in region S2. Such a geometric partition may be signaled to the receiver (e.g., decoder) by encoding positions P1, P2, P3, P4 and/or representations of these positions, such as without limitation using coordinates such as polar coordinates, cartesian coordinates, or the like, indices into predefined templates, or other characterizations of the partitions) in a video bitstream.

Still referring to FIG. 1, when encoding video data utilizing geometric partitioning at the pixel level, a line segment P1P2 (or more specifically points P1 and P2) may be determined. In order to determine line segment P1P2 (or more specifically points P1 and P2) that best divides the block when utilizing geometric partitioning at the pixel level, the possible combinations of points P1 and P2 depends on M and N, which are the block width and height. For a block of size M×N, there are (M−1)×(N−1)×3 possible partitions. Identifying the right partition thus can become a computationally expensive task of evaluating motion estimation for all possible partitions, which can increase the amount of time and/or processing power required to encode a video as compared to encoding using rectangular partitioning (e.g., without geometric partitioning at the pixel level). What constitutes the best or right partition can be determined according to a metric and may change from implementation to implementation.

In some implementations, and still referring to FIG. 1, partitioning occurs iteratively in that a first partition can be determined (e.g., determine line P1P2 and associated regions) forming two regions, and then one of those regions is further partitioned. For example, the partitioning described with reference to FIG. 1 can be performed to partition a block into two regions. One of those regions can be further partitioned (e.g., to form new region S1 and region S2). The process can continue to perform block level geometric partitioning until a stopping criteria is reached.

Figure 2:
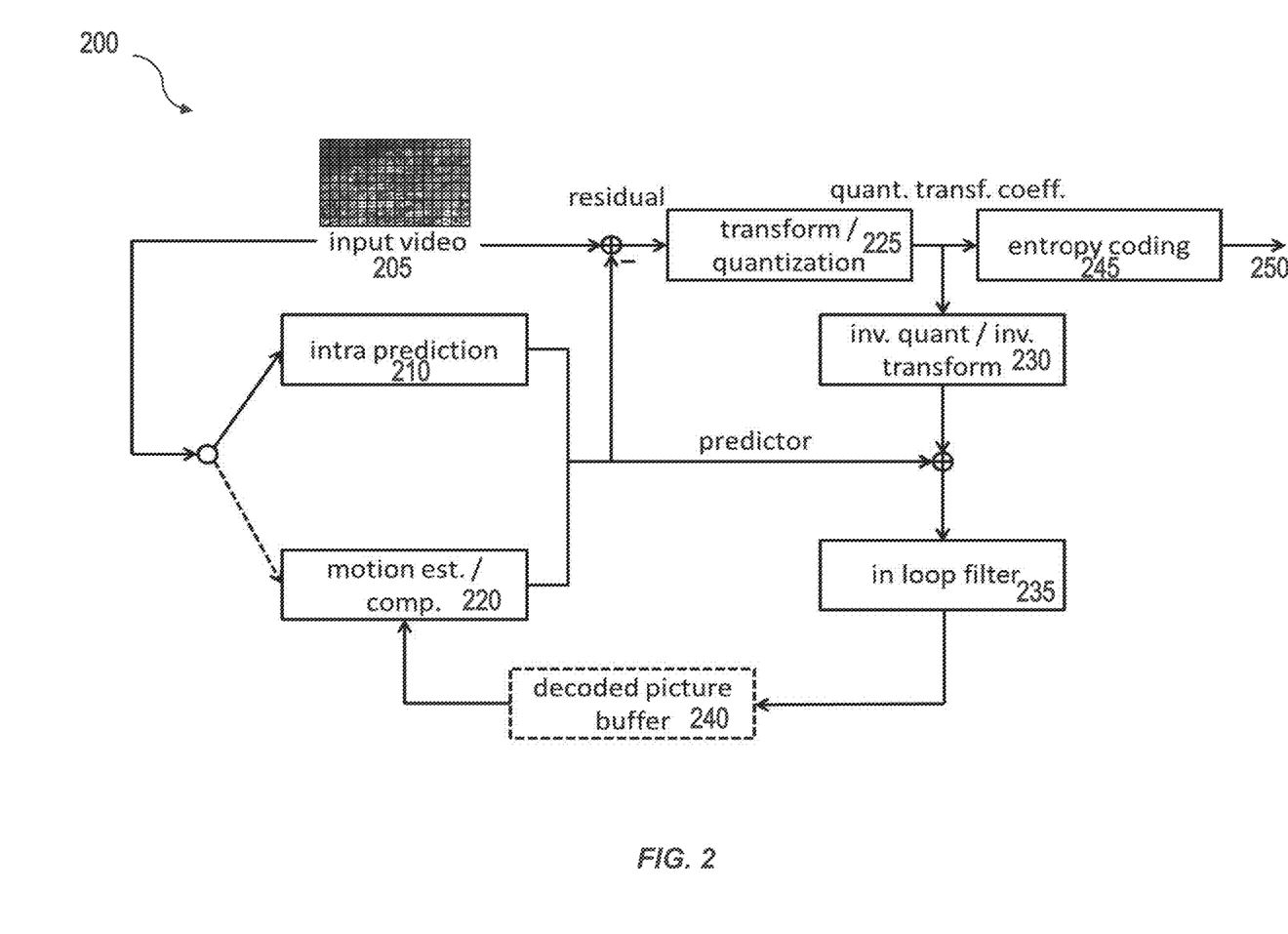
FIG. 2 is a system block diagram illustrating an example video encoder capable of shape adaptive discrete cosine transformation (SA-DCT) for geometric partitioning with an adaptive number of regions that can improve complexity and processing performance for video encoding and decoding.

FIG. 2 is a system block diagram illustrating an example video encoder 200 capable of SA-DCT and/or B-DCT for geometric partitioning with an adaptive number of regions that can improve complexity and processing performance for video encoding and decoding. The example video encoder 200 receives an input video 205, which can be initially segmented or dividing according to a processing scheme, such as a tree-structured macro block partitioning scheme (e.g., quad-tree plus binary tree). An example of a tree-structured macro block partitioning scheme can include partitioning a picture frame into large block elements called coding tree units (CTU). In some implementations, each CTU can be further partitioned one or more times into a number of sub-blocks called coding units (CU). The final result of this partitioning can include a group of sub-blocks that can be called predictive units (PU). Transform units (TU) can also be utilized. Such a partitioning scheme can include performing geometric partitioning with an adaptive number of regions according to some aspects of the current subject matter.

With continued reference to FIG. 2, the example video encoder 200 includes an intra prediction processor 215, a motion estimation/compensation processor 220 (also referred to as an inter prediction processor) capable of supporting geometric partitioning with an adaptive number of regions, a transform/quantization processor 225, an inverse quantization/inverse transform processor 230, an in-loop filter 235, a decoded picture buffer 240, and an entropy coding processor 245. In some implementations, the motion estimation/compensation processor 220 can perform geometric partitioning. Bitstream parameters that signal geometric partitioning modes can be input to the entropy coding processor 245 for inclusion in the output bitstream 250.

In operation, and continuing to refer to FIG. 2, for each block of a frame of the input video 205, whether to process the block via intra picture prediction or using motion estimation/compensation can be determined. The block can be provided to the intra prediction processor 210 or the motion estimation/compensation processor 220. If the block is to be processed via intra prediction, the intra prediction processor 210 can perform the processing to output the predictor. If the block is to be processed via motion estimation/compensation, the motion estimation/compensation processor 220 can perform the processing including use of geometric partitioning to output the predictor.

Still referring to FIG. 2, a residual can be formed by subtracting the predictor from the input video. The residual can be received by the transform/quantization processor 225, which can determine whether the prediction error (e.g., residual size) is considered "high" or "low" error (for example, by comparing a size or error metric of the residual to a threshold). Based on the determination, the transform/quantization processor 225 can select a transform type, which can include B-DCT and SA-DCT. In some implementations, the transform/quantization processor 225 selects a transform type of B-DCT where the residual is considered to have a high error and selects a transform type of SA-DCT where the residual is considered to have a low error. Based on the selected transform type, the transform/quantization processor 225 can perform transformation processing (e.g., SA-DCT or B-DCT) to produce coefficients, which can be quantized. The quantized coefficients and any associated signaling information (which can include the selected transform type and/or the number of coefficients used) can be provided to the entropy coding processor 245 for entropy encoding and inclusion in the output bitstream 250. The entropy encoding processor 245 can support encoding of signaling information related to SA-DCT for geometric partitioning with adaptive number of regions. In addition, the quantized coefficients can be provided to the inverse quantization/inverse transformation processor 230, which can reproduce pixels, which can be combined with the predictor and processed by the in-loop filter 235, the output of which is stored in the decoded picture buffer 240 for use by the motion estimation/compensation processor 220 that is capable of supporting geometric partitioning with an adaptive number of regions.

Figure 3:
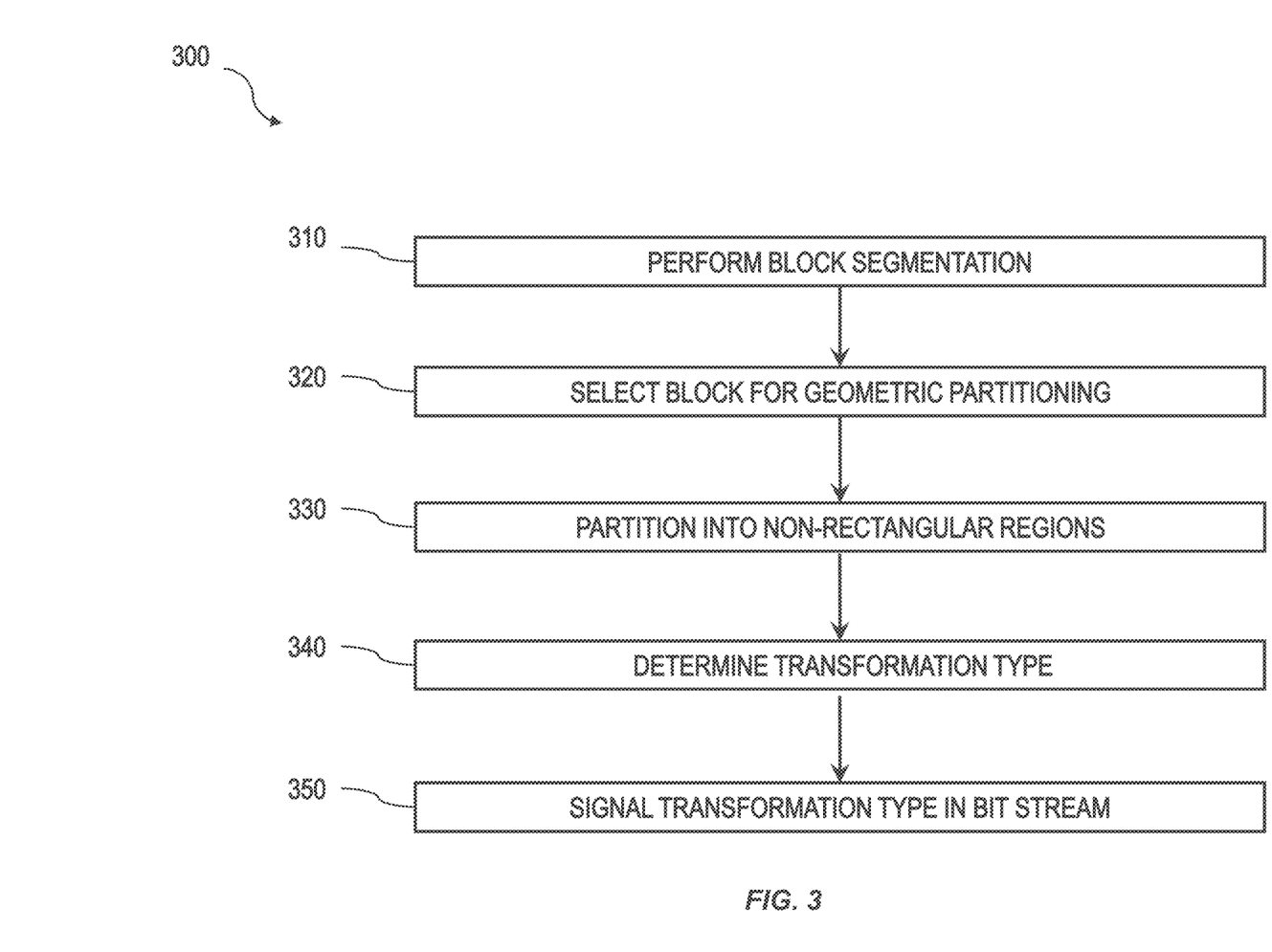
FIG. 3 is a process flow diagram illustrating an example process of encoding a video with SA-DCT for geometric partitioning with an adaptive number of regions.

Referring now to FIG. 3, a process flow diagram illustrating an example process 300 of encoding a video with SA-DCT for geometric partitioning with an adaptive number of regions that can improve complexity and processing performance for video encoding and decoding is illustrated. At step 310, a video frame may undergo initial block segmentation, for example, using a tree-structured macro block partitioning scheme that may include partitioning a picture frame into CTUs and CUs. At 320, a block may be selected for geometric partitioning. Selection may include identifying according to a metric rule that a block is to be processed according to a geometric partitioning mode. At step 330, a selected block may be partitioned into three or more non-rectangular regions according to geometric partitioning mode.

At step 340, and still referring to FIG. 3, a transform type (also referred to as a transformation type) for each geometrically partitioned region may be determined. This may include determining whether a prediction error (e.g., residual size) is considered "high" or "low" error (for example, by comparing a size or error metric of the residual to a threshold). Based on determination, a transform type may be selected, for instance using a quadtree plus binary decision tree process as described below, which transform type may include without limitation B-DCT or SA-DCT. In some implementations, a transform type of B-DCT is selected where residual is considered to have a high error and a transform type of SA-DCT is selected where residual is considered to have a low error. Based on the selected transform type, transformation processing (e.g., SA-DCT or B-DCT) may be performed to produce coefficients, which may be quantized.

At step 350, and continuing to refer to FIG. 3, a determined transform type may be signaled in the bitstream. The transformed and quantized residual can be included in the bitstream. In some implementations, the number of transform coefficients can be signaled in the bitstream.

Figure 4:
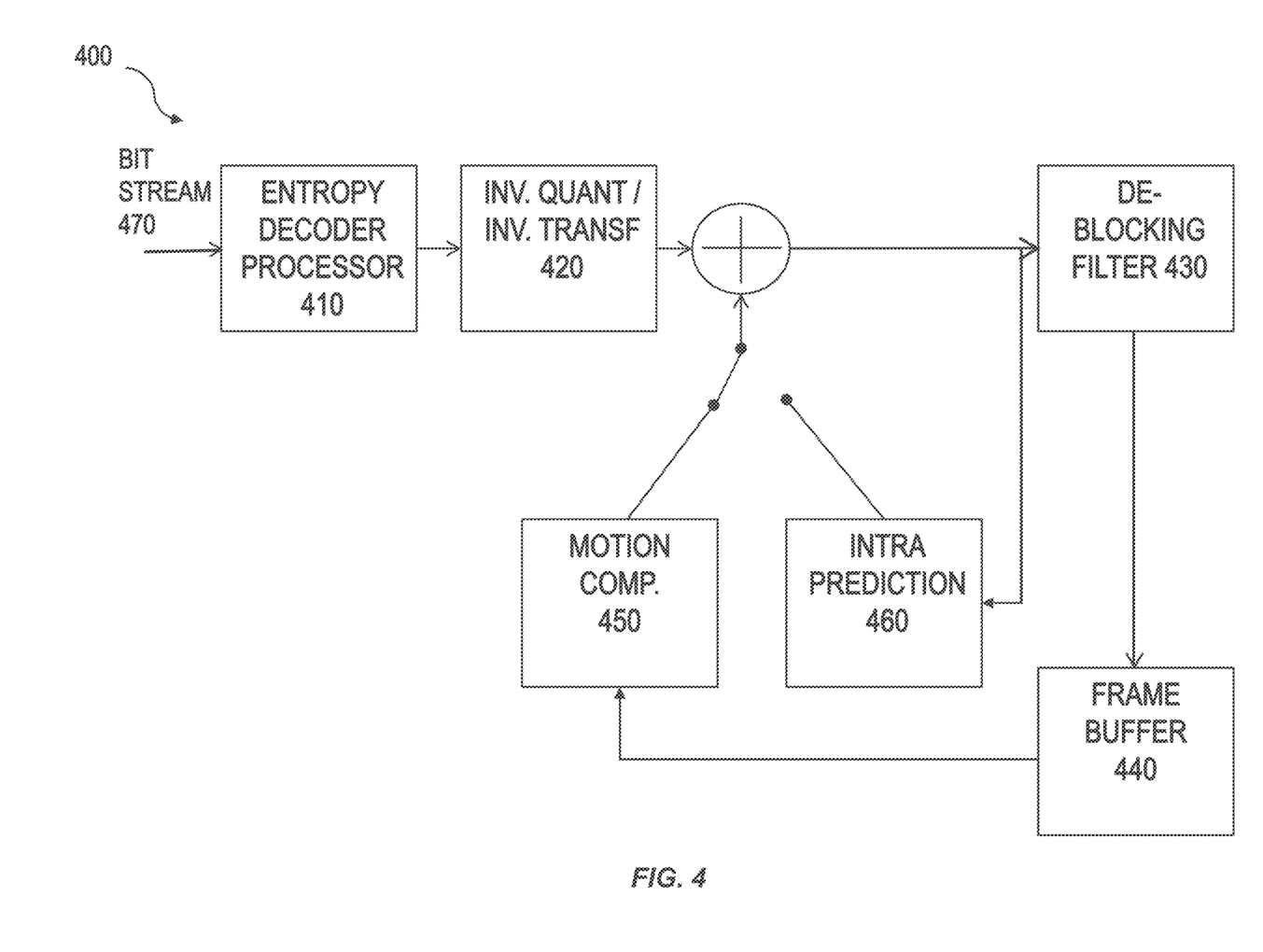
FIG. 4 is a system block diagram illustrating an example decoder capable of decoding a bitstream using SA-DCT for geometric partitioning with an adaptive number of regions.

FIG. 4 is a system block diagram illustrating a non-limiting example of a decoder 400 capable of decoding a bitstream 470 using DCT, including without limitation SA-DCT and/or B-DCT, for geometric partitioning with an adaptive number of regions, which may improve complexity and processing performance for video encoding and decoding. Decoder 400 includes an entropy decoder processor 410, an inverse quantization and inverse transformation processor 420, a deblocking filter 430, a frame buffer 440, motion compensation processor 450 and intra prediction processor 460. In some implementations, bitstream 470 includes parameters that signal a geometric partitioning mode and transformation type. In some implementations, bitstream 470 includes parameters that signal the number of transform coefficients. The motion compensation processor 450 can reconstruct pixel information using geometric partitioning as described herein.

In operation, and still referring to FIG. 4, bitstream 470 may be received by the decoder 400 and input to entropy decoder processor 410, which may entropy decode the bitstream into quantized coefficients. Quantized coefficients may be provided to inverse quantization and inverse transformation processor 420, which may determine a coding transformation type (e.g., B-DCT or SA-DCT) and perform inverse quantization and inverse transformation according to the determined coding transformation type to create a residual signal. In some implementations, inverse quantization and inverse transformation processor 420 may determine a number of transform coefficients and perform inverse transformation according to the determined number of transform coefficients.

Still referring to FIG. 4, residual signal may be added to an output of motion compensation processor 450 or intra prediction processor 460 according to a processing mode. Output of a motion compensation processor 450 and intra prediction processor 460 may include a block prediction based on a previously decoded block. A sum of the prediction and residual may be processed by deblocking filter 430 and stored in a frame buffer 440. For a given block, (e.g., CU or PU), when a bitstream 470 signals that a partitioning mode is block level geometric partitioning, motion compensation processor 450 may construct a prediction based on the geometric partition approach described herein.

Figure 5:
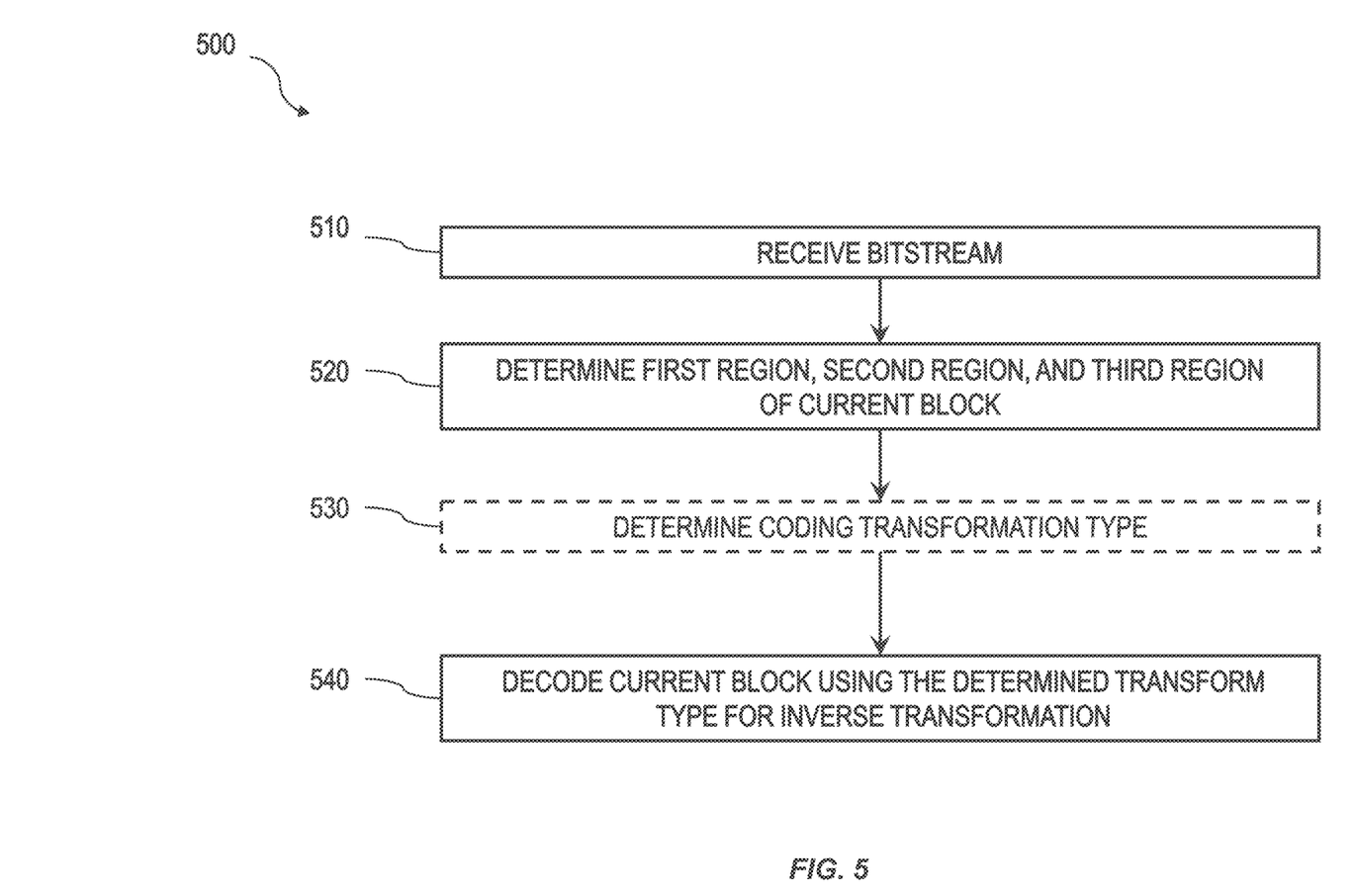
FIG. 5 is a process flow diagram illustrating an example process of decoding a bitstream using SA-DCT for geometric partitioning with an adaptive number of regions.

FIG. 5 is a process flow diagram illustrating an example process 500 of decoding a bitstream using SA-DCT for geometric partitioning with an adaptive number of regions, which can improve complexity and processing performance for video encoding and decoding. At step 510, a bitstream is received, which may include a current block (e.g., CTU, CU, PU). Receiving may include extracting and/or parsing current block and associated signaling information from bitstream. Decoder may extract or determine one or more parameters that characterize the geometric partitioning. These parameters may include, for example, indices of a start and end of a line segment (e.g., P1, P2, P3, P4); extraction or determining may include identifying and retrieving the parameters from the bitstream (e.g., parsing the bitstream).

At step 520, and still referring to FIG. 5, a first region, a second region, and a third region of the current block may be determined and according to a geometric partitioning mode. Determining may include determining whether geometric partitioning mode is enabled (e.g., true) for the current block. If geometric partitioning mode is not enabled (e.g., false), decoder may process current block using an alternative partitioning mode. If geometric partitioning mode is enabled (e.g., true), three or more regions may be determined and/or processed.

At optional step 530, and continuing to refer to FIG. 5, a coding transformation type may be determined. A coding transformation type may be signaled in bitstream. For example, bitstream may be parsed to determine a coding transformation type, which may specify B-DCT or SA-DCT. Determined coding transformation type may be for decoding a first region, a second region, and/or a third region.

At 540, and still referring to FIG. 5, a current block may be decoded. Decoding of current block may include using a determined transform type for inverse transformation for each of a first region, a second region, and/or a third region. Decoding may include determining an associated motion information for each region and according to geometric partitioning mode.

Although a few variations have been described in detail above, other modifications or additions are possible. For example, the geometric partitioning can be signaled in the bitstream based on rate-distortion decisions in the encoder. The coding can be based on a combination of regular predefined partitions (e.g., templates), temporal and spatial prediction of the partitioning, and additional offsets. Each geometrically partitioned region can utilize motion compensated prediction or intra-prediction. The boundary of the predicted regions can be smoothed before the residual is added.

In some implementations, a quadtree plus binary decision tree (QTBT) may be implemented. In QTBT, at the Coding Tree Unit level, partition parameters of QTBT are dynamically derived to adapt to the local characteristics without transmitting any overhead. Subsequently, at the Coding Unit level, a joint-classifier decision tree structure may eliminate unnecessary iterations and control the risk of false prediction. In some implementations, geometric partitioning with an adaptive number of regions may be available as an additional partitioning option available at every leaf node of the QTBT.

In some implementations, a decoder may include a partition processor that generates geometric partition for a current block and provides all partition-related information for dependent processes. Partition processor may directly influence motion compensation as it may be performed segment-wise in case a block is geometrically partitioned. Further, partition processor may provide shape information to intra-prediction processor and transform coding processor.

In some implementations, additional syntax elements may be signaled at different hierarchy levels of the bitstream. For enabling geometric partitioning with an adaptive number of regions for an entire sequence, an enable flag may be coded in a Sequence Parameter Set (SPS). Further, a CTU flag may be coded at the coding tree unit (CTU) level to indicate whether any coding units (CU) use geometric partitioning with an adaptive number of regions. A CU flag may be coded to indicate whether a current coding unit utilizes geometric partitioning with an adaptive number of regions. Parameters which specify a line segment on block may be coded. For each region, a flag may be decoded, which may specify whether a current region is inter- or intra-predicted.

In some implementations, a minimum region size may be specified.

The subject matter described herein provides many technical advantages. For example, some implementations of the current subject matter can provide for partitioning of blocks that reduces complexity while increasing compression efficiency. In some implementations, blocking artifacts at object boundaries can be reduced.

It is to be noted that any one or more of the aspects and embodiments described herein may be conveniently implemented using digital electronic circuitry, integrated circuitry, specially designed application specific integrated circuits (ASICs), field programmable gate arrays (FPGAs) computer hardware, firmware, software, and/or combinations thereof, as realized and/or implemented in one or more machines (e.g., one or more computing devices that are utilized as a user computing device for an electronic document, one or more server devices, such as a document server, etc.) programmed according to the teachings of the present specification, as will be apparent to those of ordinary skill in the computer art. These various aspects or features may include implementation in one or more computer programs and/or software that are executable and/or interpretable on a programmable system including at least one programmable processor, which may be special or general purpose, coupled to receive data and instructions from, and to transmit data and instructions to, a storage system, at least one input device, and at least one output device. Appropriate software coding may readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, Programmable Logic Devices (PLDs), and/or any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
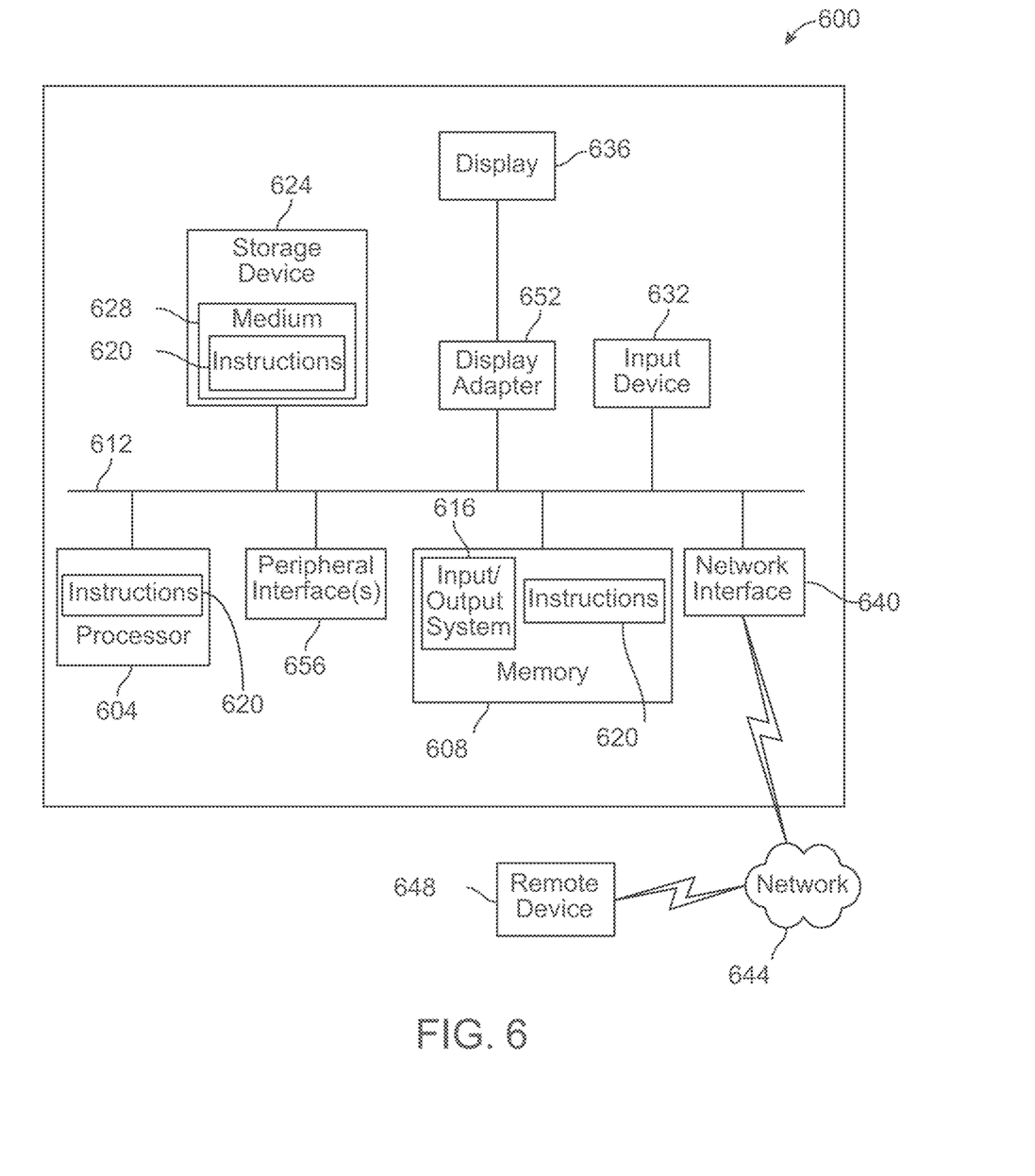
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments as disclosed herein. Accordingly, this description is meant to be taken only by way of example, and not to otherwise limit the scope of this invention.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A decoder, the decoder comprising circuitry configured to:
   receive a bitstream comprising a coded current picture including a coded coding tree unit and signaling information, the signaling information including a sequence parameter set containing a flag indicating that geometric partitioning is enabled for the bitstream, first geometric partition index information enabling the decoder to determine for a first straight line partition boundary in the coding tree unit a first endpoint on a boundary of the coding tree unit and a second endpoint on the boundary of the coding tree unit, second geometric partition index information enabling the decoder to determine for a second straight line partition boundary in the coding tree unit a first endpoint on the boundary of the coding tree unit and a second endpoint on the first straight line partition boundary;
   decode the coded coding tree unit using the first geometric partition index information and second geometric partition index information to reconstruct the coding tree unit, the reconstructed coding tree unit being partitioned into three non-rectangular regions by the first and second straight line partition boundaries.

2. A method of decoding, the method comprising:
   receiving, by a decoder, a bitstream including a coded current picture including a coded coding tree unit, and signaling information, the signaling information including a sequence parameter set containing a flag indicating that geometric partitioning is enabled for the bitstream, first geometric partition index information enabling the decoder to determine for a first straight line partition boundary in the coding tree unit a first endpoint on a boundary of the coding tree unit and a second endpoint on the boundary of the coding tree unit, second geometric partition index information enabling the decoder to determine for a second straight line partition boundary in the coding tree unit a first endpoint on the boundary of the coding tree unit and a second endpoint on the first straight line partition boundary; and
   decoding, by the decoder, the coded coding tree unit using the first geometric partition index information and second geometric partition index information to reconstruct the coding tree unit, the reconstructed coding tree unit being partitioned into three non-rectangular regions by the first and second straight line partition boundaries.

3. The decoder of claim 1, wherein the coding tree unit is a 128×128 coding tree unit comprising multiple coding units and the signaling information including transform type information.

4. The method of claim 2, wherein the coding tree unit is a 128×128 coding tree unit comprising multiple coding units and the signaling information including transform type information.

\* \* \* \* \*